O. C. REEVES.
PREDETERMINED WEIGHT SCALE.
APPLICATION FILED MAR. 22, 1920.

1,397,547.

Patented Nov. 22, 1921.

Inventor
Orwell C. Reeves
By George R. Frye
Attorney

UNITED STATES PATENT OFFICE.

ORWELL C. REEVES, OF TOLEDO, OHIO, ASSIGNOR TO TOLEDO SCALE COMPANY, OF TOLEDO, OHIO, A CORPORATION OF NEW JERSEY.

PREDETERMINED-WEIGHT SCALE.

1,397,547.   Specification of Letters Patent.   Patented Nov. 22, 1921.

Application filed March 22, 1920. Serial No. 367,659.

*To all whom it may concern:*

Be it known that I, ORWELL C. REEVES, a citizen of the United States, residing at Toledo, in the county of Lucas and State of Ohio, have invented certain new and useful Improvements in Predetermined - Weight Scales, of which the following is a specification.

This invention relates to weighing scales, and particularly to the indicating mechanism thereof, and one of its principal objects is the provision of predetermined weight indicators for enhancing the usefulness of the scale in weighing out ingredients of compounds.

Another object is the provision of means whereby such predetermined weight indicators may be manipulated from without the scale.

Another object is the provision of a device for weighing out ingredients of compounds which may be used by a person to whom the mixing formula has not been divulged.

Other objects and advantages will be apparent from the following description, in which reference is had to the accompanying drawings illustrating a preferred embodiment of my invention and wherein similar reference numerals designate similar parts throughout the several views.

In the drawings:—

Figure 1:
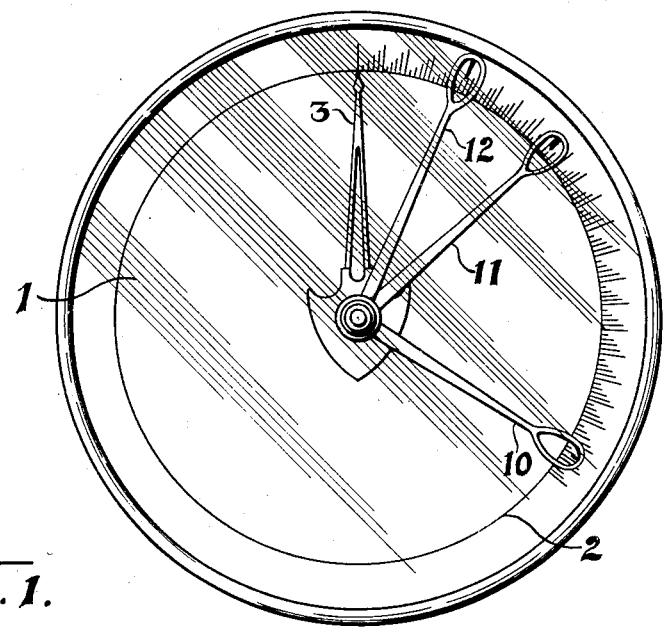
Figure 1 is a front elevation of a scale dial showing my invention applied thereto.

I have shown my invention as applied to a scale having a circular chart, but it is to be understood that the invention is also adapted for employment with other types of scales, such, for example, as those having fan-shaped charts, and that I contemplate its use wherever applicable.

In the embodiment shown, the indicating mechanism of the scale is inclosed within a substantially watch-casing-shaped housing having a crystal 1 through which the dial 2 and the indicator hand 3 are visible. The indicator hand 3 is fixed upon a shaft 4 suitably connected by means of a pinion 6 to the weighing mechanism (not shown) of the scale.

When there is no load upon the scale, the indicator hand stands vertical. When a load is placed upon the scale, the indicator hand swings through an arc proportional to the weight of the load. The dial 2 over which the hand swings may be graduated as shown in Fig. 1, so that the hand 3 when in weighing position indicates the weight of the load in pounds, ounces, or other suitable denominations of weight. When the dial 2 is so marked the scale may be used in ordinary weighing operations without disturbing the manually movable predetermined weight pointers and without interference from them.

Figure 2:
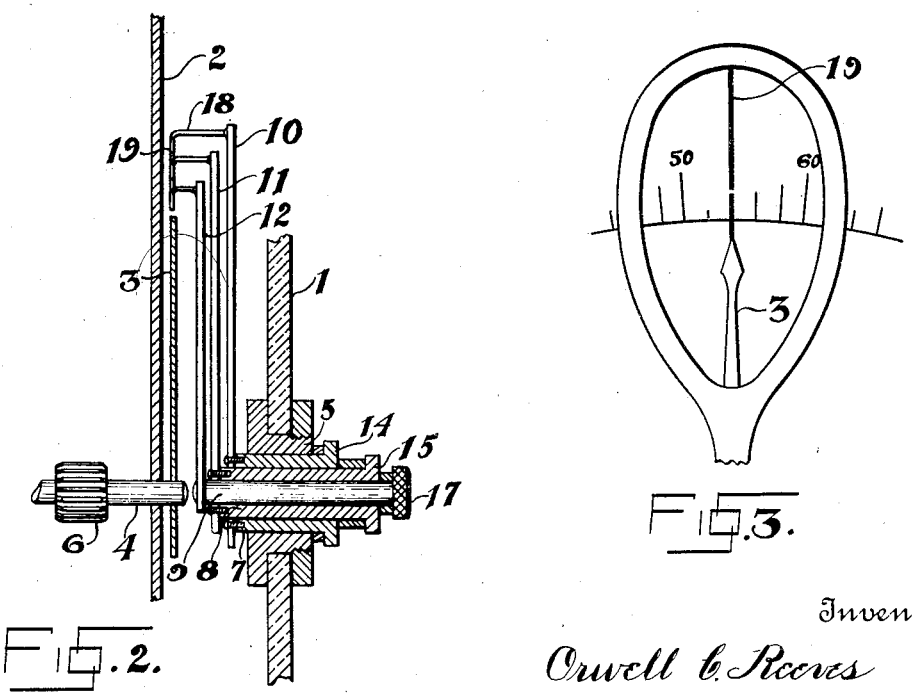
Fig. 2 is a fragmentary central vertical section through a chart and indicating hand showing a series of predetermined weight pointers in position.

As shown in Fig. 2, the glass front 1 of the casing is provided with an opening in which is mounted a bushing 5 to support concentric sleeves 7 and 8 and a central shaft 9 arranged in horizontal alinement with the shaft 4 carrying the indicator hand. Fixed to the inner ends of the sleeves 7 and 8 are hands or pointers 10 and 11, and a similar pointer 12 is fixed to the inner end of the shaft 9. The outer ends of the sleeves 7 and 8 are provided with knurled flanges 14 and 15 forming knobs by means of which the sleeves may be turned to swing the pointers over the dial 2. The outer end of the shaft 9 is also provided with a knurled manipulating knob 17.

Figure 3:
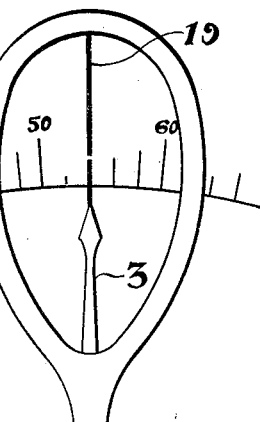
Fig. 3 is an enlarged fragmentary view showing the tips of the indicating hand and a predetermined weight pointer in registration.

The various sleeves and the bushing in the illustrative embodiment shown are snugly nested so that each will be frictionally held in the position in which it is purposely placed. If desired, other clutching or holding means may be employed. Each of the pointers 10, 11 and 12 consists of a hand having a loop-shaped outer end, to which is secured a rearwardly-extending finger 18 having its tip turned inwardly, as at 19. When the indicator hand 3 registers with the pointer, the end of the hand 3 and the tip 19 of the finger are both visible through the loop (see Fig. 3). Since the end of the hand 3 and the tips 19 of all the fingers are in the same plane, there is no possibility of the occurrence of errors in reading due to parallax.

The pointers 10, 11 and 12 may, if desired, be successively numbered or otherwise distinctively marked, and the ingredients in a compound may be designated by corresponding numbers or marks. Thus, for example, if 280 lbs. of No. 1 ingredient are to be used in a certain compound, the No. 10 pointer is set at 280 lbs. on the chart, and if 320 lbs. of No. 2 ingredient are to be used, No. 11 pointer is set at 600 lbs., the sum of 280 and 320 lbs., and so on until a pointer is set for each ingredient. All that the operator has then to do is to put in No. 1 ingredient until the indicator hand points to No. 10 predetermined weight pointer, add No. 2 ingredient until the indicator hand points to No. 11 pointer, and so on. He need not keep in mind or even know the numbers of pounds of the various ingredients, and need make no mental calculation whatever.

When the scale is to be used for secret compounding the dial may be left blank. The foreman or other authorized person may then set such of the pointers 10, 11 and 12 as are to be used by means of master weights. The compounding may thus be effected without divulging the formula even to the operator of the scale.

While it will be apparent that the illustrated embodiment of my invention herein disclosed is well calculated to adequately fulfil the objects primarily stated, it is to be understood that the invention is susceptible to variation, modification and change within the spirit and scope of the subjoined claims.

Having described my invention, I claim:

1. In a device of the class described, in combination weighing mechanism, an indicator shaft connected thereto, an indicator hand fixed to said shaft and capable of a complete rotation and a plurality of manually-operable hands rotatably mounted on an axis substantially coincident with that of said indicator shaft.

2. In a device of the class described, in combination weighing mechanism, an indicator shaft connected thereto, an indicator hand fixed to said shaft, and a plurality of manually-operable hands rotatably mounted on an axis substantially coincident with that of said indicator shaft, said indicator hand and said manually-operable hands having pointing tips lying in substantially the same plane.

3. In a device of the class described, in combination, a dial, an indicator shaft projecting through said dial, an indicator hand fixed to said shaft, a transparent plate overlying said dial, and a plurality of manually-operable hands mounted on said plate.

4. In a device of the class described, in combination, a dial, an indicator shaft projecting through said dial, an indicator hand fixed to said shaft, a transparent plate overlying said dial, and a plurality of manually-operable hands mounted on said plate and having operating knobs projecting outwardly therefrom, the pointing tips of all of said hands lying in the same plane.

5. In a device of the class described, in combination, a dial, an indicator hand coöperating therewith, a plurality of manually-operable hands rotatably mounted on an axis substantially coincident with the axis of rotation of said indicator hand, each of said manually-operable hands having a loop-shaped end and a pointing tip behind said loop-shaped end whereby the said pointing tip and the tip of said indicator hand are visible through said loop when said tips are in radial alinement.

6. In a device of the class described, in combination, weighing mechanism, a dial, an indicator hand connected to said weighing mechanism and coöperating with said dial, a plurality of manually-operable hands rotatably mounted on an axis substantially coincident with the axis of rotation of said indicator hand, each of said manually-operable hands having a loop-shaped end, and a pointed tip behind said loop-shaped end, whereby said pointed tip and the tip of said indicator hand are visible through said loop when said tips are in radial alinement.

7. In a device of the class described, in combination, a dial, an indicator shaft projecting through said dial, an indicator hand fixed to said shaft, a transparent plate overlying said dial, a plurality of manually-operable hands mounted on said plate and lying between said plate and said dial, and operating knobs for said manually-operable hands positioned exteriorly of said transparent plate.

ORWELL C. REEVES.

Witnesses:
C. E. WILCOX,
C. O. MARSHALL.